United States Patent
Harada et al.

(10) Patent No.: US 12,142,764 B2
(45) Date of Patent: Nov. 12, 2024

(54) POSITIVE ELECTRODE MIXTURE LAYER, CONDUCTIVE ADDITIVE, POSITIVE ELECTRODE MIXTURE, AND LITHIUM-ION SECONDARY BATTERY

(71) Applicant: Resonac Corporation, Tokyo (JP)

(72) Inventors: Daisuke Harada, Tokyo (JP); Hirofumi Inoue, Tokyo (JP); Daisuke Kohno, Tokyo (JP); Akihisa Tonegawa, Tokyo (JP)

(73) Assignee: Resonac Corporation, Tokyo (JP)

(*) Notice: Subject to any disclaimer, the term of this patent is extended or adjusted under 35 U.S.C. 154(b) by 0 days.

(21) Appl. No.: 18/534,281

(22) Filed: Dec. 8, 2023

(65) Prior Publication Data

US 2024/0120481 A1 Apr. 11, 2024

Related U.S. Application Data

(63) Continuation of application No. PCT/JP2022/043115, filed on Nov. 22, 2022.

(30) Foreign Application Priority Data

Nov. 22, 2021 (JP) ................................. 2021-189675

(51) Int. Cl.
*H01M 4/58* (2010.01)
*H01M 4/62* (2006.01)
*H01M 10/0525* (2010.01)
*H01M 4/02* (2006.01)

(52) U.S. Cl.
CPC ......... *H01M 4/5825* (2013.01); *H01M 4/625* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2010/0136431 A1 | 6/2010 | Lee et al. | |
| 2012/0171566 A1 | 7/2012 | Yoshitake et al. | |
| 2012/0214070 A1 | 8/2012 | Yamamoto et al. | |
| 2013/0004657 A1* | 1/2013 | Xu | H01B 1/24 252/511 |
| 2013/0248772 A1 | 9/2013 | Jo | |
| 2015/0037673 A1* | 2/2015 | Zaghib | H01M 4/505 429/224 |

FOREIGN PATENT DOCUMENTS

| | | |
|---|---|---|
| CN | 103109404 A | 5/2013 |
| CN | 103430362 A | 12/2013 |
| CN | 103918109 A | 7/2014 |
| CN | 104471753 A | 3/2015 |
| CN | 105280904 A | 1/2016 |
| CN | 106532059 A | 3/2017 |
| CN | 111640526 A | 9/2020 |
| CN | 112823437 A | 5/2021 |
| JP | 2014-12902 A | 1/2014 |
| JP | 5497220 B1 | 5/2014 |
| JP | 2014-177722 A | 9/2014 |
| JP | 2015-519699 A | 7/2015 |
| JP | 2016-48698 A | 4/2016 |
| JP | 2018-97961 A | 6/2018 |
| JP | 2018-523902 A | 8/2018 |
| JP | 2021-121983 A | 8/2021 |
| JP | 2021-524129 A | 9/2021 |
| KR | 10-2014-0082988 A | 7/2014 |
| TW | 201331125 A1 | 8/2013 |
| WO | 2020/105729 A1 | 5/2020 |

OTHER PUBLICATIONS

S.-M. Lee, S.-H. Lee, J.-S Roh. Analysis of Activation Process of Carbon Black Based on Structural Parameters Obtained by XRD Analysis, Crystals 2021, 11, 153.*
"Carbon nanotube," Wikipedia, https://en.wikipedia.org/w/index.php?title=Carbon_nanotube&oldid=1220150392 (downloaded Apr. 23, 2024) (49 pages).
Ocsial: "Tuball(Tm) Health & Safety and Environmental Status", Sep. 26, 2020 (2020-09-26), pp. 1-3.
Predtechenskiy et al.: "SWCNT vs MWCNT and Nanofibers. Applications in Lithium-Ion Batteries and Transparent Conductive Films", Advanced Materials: Techconnect Brief, Jun. 1, 2015 (Jun. 1, 2015), pp. 115-117.

* cited by examiner

*Primary Examiner* — Carlos Barcena
(74) *Attorney, Agent, or Firm* — Sughrue Mion, PLLC

(57) ABSTRACT

A positive electrode mixture layer for a lithium-ion secondary battery suitable for producing a lithium-ion secondary battery with high rate characteristics at an ordinary temperature and low temperatures and low internal resistance (DCR) at low temperatures, characterized by including a positive electrode active material, a binder, and a conductive additive, in which the conductive additive includes carbon black, a carbon nanotube (1) having an average fiber diameter of 80 to 400 nm, and a carbon nanotube (2) having an average fiber diameter of 0.4 to 3.0 nm, the content rates of the carbon black, the carbon nanotube (1), and the carbon nanotube (2) in the conductive additive are 40 to 80% by mass, 10 to 50% by mass, and 1 to 30% by mass, respectively, and the content rate of the conductive additive in the positive electrode mixed layer is 0.1 to 5.0% by mass.

15 Claims, No Drawings

POSITIVE ELECTRODE MIXTURE LAYER, CONDUCTIVE ADDITIVE, POSITIVE ELECTRODE MIXTURE, AND LITHIUM-ION SECONDARY BATTERY

This application is a Rule 53(b) Continuation of International Application No. PCT/JP2022/043115 filed Nov. 22, 2022, claiming priority based on Japanese Patent Application No. 2021-189675 filed Nov. 22, 2021, the respective disclosures of which are incorporated herein by reference in their entireties.

TECHNICAL FIELD

The present invention belongs to a field of positive electrode mixture layers in lithium-ion secondary batteries and a field of conductive additives included in electrode mixture layers.

BACKGROUND ART

In batteries, conductive additives are usually added to electrode mixture layers when active materials have no or little electron conductivity, to impart the electron conductivity to the entire electrode mixture layers. Carbon powders such as carbon black, graphite, and carbon nanotubes have been used as such conductive additives.

In recent years, the amount of lithium-ion secondary batteries used in automotive applications have been rapidly increased, thereby requiring a higher energy density, i.e., a higher capacity and higher voltage, improvement on capacity, rate characteristics, storage characteristics as well as cycle characteristics at lowered temperatures and elevated temperatures in preparation for use in a cold region and warm region. In order to meet these requirements, various efforts have been made also in conductive additives.

Patent Literature 1 (JP5497220B) describes a composite carbon fiber including multi-walled carbon nanotubes in which a proportion of those with a fiber diameter of 5 nm or larger and 40 nm or smaller is 99% by number or more, carbon particles having a primary particle size of 20 nm or larger and 100 nm or smaller, and graphitized carbon nanofibers in which a proportion of those with a fiber diameter of 50 nm or larger and 300 nm or smaller is 99% by number or more, wherein the multi-walled carbon nanotubes are homogeneously dispersed between the graphitized carbon nanofibers and carbon particles.

Patent Literature 2 (JP2021-524129A) discloses a freestanding electrode wherein an electrochemical active material contains lithiated iron phosphate particles (LiFePO$_4$) and vapor phase-grown carbon fibers (VGCF) as the first electrically conductive materials acting as current collectors, and a freestanding electrode wherein the second electrically conductive material is selected from acetylene black, a carbon fiber, a carbon nanotube, and combinations of at least two thereof.

Patent Literature 3 (JP2016-48698A) discloses a positive electrode mixture for a lithium-ion secondary battery, including a positive electrode material containing an electrically conductive agent for positive electrodes of lithium-ion secondary batteries in which carbon nanotubes (CNT) having a diameter of 0.5 to 10 nm and a length of 10 μm or longer are dispersed in water and a positive electrode active material, and a binder. Patent Literature 3 also discloses an Example in which a combination of CNT and acetylene black (AB) is used as a conductive additive.

CITATION LIST

Patent Literature

[Patent Literature 1] JP5497220B
[Patent Literature 2] JP2021-524129A
[Patent Literature 3] JP2016-48698A

SUMMARY OF INVENTION

Technical Problem

An object of the present invention is to provide a lithium-ion secondary battery with high rate characteristics at an ordinary temperature and low temperatures and low internal resistance (DCR) at low temperatures, a conductive additive, a positive electrode mixture, and a positive electrode mixture layer, for example, which can be used to produce such a lithium-ion secondary battery.

Solution to Problem

The present inventors have found that the aforementioned problems can be solved by a conductive additive including carbon black and two predetermined kinds of carbon nanotubes and thus have completed the present invention.

The present invention relates, for example, to the following [1] to [14].

[1]
A positive electrode mixture layer for a lithium-ion secondary battery, the layer comprising:
  a positive electrode active material, a binder, and a conductive additive,
  wherein the conductive additive comprises carbon black, a carbon nanotube 1 having an average fiber diameter of 80 to 400 nm, and a carbon nanotube 2 having an average fiber diameter of 0.4 to 3.0 nm,
  the content rates of the carbon black, the carbon nanotube 1, and the carbon nanotube 2 in the conductive additive are 40 to 80% by mass, 10 to 50% by mass, and 1 to 30% by mass, respectively, and
  the content rate of the conductive additive in the positive electrode mixture layer is 0.1 to 5.0% by mass.

[2]
The positive electrode mixture layer for a lithium-ion secondary battery according to the [1], wherein the carbon nanotube 2 is a single-walled carbon nanotube.

[3]
The positive electrode mixture layer for a lithium-ion secondary battery according to the [1] or the [2], wherein the average fiber length of the carbon nanotube 1 is 2 to 20 μm.

[4]
The positive electrode mixture layer for a lithium-ion secondary battery according to any one of the [1] to [3], wherein the average fiber length of the carbon nanotube 2 is 5 μm or longer.

[5]
The positive electrode mixture layer for a lithium-ion secondary battery according to any one of the [1] to [4], wherein the carbon black is acetylene black.

[6]
The positive electrode mixture layer for a lithium-ion secondary battery according to any one of the [1] to [5], wherein the 50% particle diameter $D_{nc50}$ of a primary particle of the carbon black in a number-based cumulative particle size distribution is 3 to 100 nm.

[7]
The positive electrode mixture layer for a lithium-ion secondary battery according to any one of the [1] to [6], wherein the positive electrode active material comprises at least one compound selected from the group consisting of $LiMPO_4$, wherein M is at least one element selected from the group consisting of Fe, Mn, Ni and Co, $LiXO_2$, wherein X is at least one element selected from Ni, Mn, Co, and Al, and $LiZ_2O_4$, wherein Z is at least one element selected from the group consisting of Ni and Mn.

[8]
The positive electrode mixture layer for a lithium-ion secondary battery according to the [7], wherein the positive electrode active material is carbon-coated $LiFePO_4$.

[9]
The positive electrode mixture layer for a lithium-ion secondary battery according to any one of the [1] to [8], wherein the 50% particle diameter $D_{nA50}$ of the positive electrode active material in a number-based cumulative particle size distribution is 0.1 to 20.0 μm.

[10]
A conductive additive used in an electrode mixture for a lithium-ion secondary battery, the additive comprising:
carbon black, a carbon nanotube 1 having an average fiber diameter of 80 to 400 nm, and a carbon nanotube 2 having an average fiber diameter of 0.4 to 3.0 nm,
wherein the content rate of the carbon black is 40 to 80% by mass,
the content rate of the carbon nanotube 1 is 10 to 50% by mass, and
the content rate of the carbon nanotube 2 is 1 to 30% by mass.

[11]
A positive electrode mixture for a lithium-ion secondary battery, the mixture comprising:
a positive electrode active material, a binder, and a conductive additive,
wherein the conductive additive is the conductive additive of the [10], and
a content rate of the conductive additive is 0.1 to 5.0% by mass.

[12]
A coating material for forming a positive electrode mixture layer for a lithium-ion secondary battery, the material comprising the positive electrode mixture of the [11] and a solvent.

[13]
A positive electrode for a lithium-ion secondary battery, the electrode comprising a current collector and a positive electrode mixture layer, wherein the positive electrode mixture layer is the positive electrode mixture layer for a lithium-ion secondary battery according to any one of the [1] to [9].

[14]
A lithium-ion secondary battery, comprising a positive electrode, a negative electrode, a separator, an electrolytic solution, and an outer packaging material of a cell, wherein the positive electrode is the positive electrode for a lithium-ion secondary battery of the [13].

Advantageous Effect of Invention

By using the conductive additive, the positive electrode mixture, or the positive electrode mixture layer, of the present invention, a lithium-ion secondary battery with high rate characteristics at an ordinary temperature and low temperatures and low internal resistance (DCR) at low temperatures, can be provided. Moreover, by enhancing capacity retention rate at low temperatures, the energy density of the lithium-ion secondary battery at low temperatures can be increased.

DESCRIPTION OF EMBODIMENT

Positive Electrode Mixture Layer, Conductive Additive and the Like

The positive electrode mixture layer for a lithium-ion secondary battery according to the present invention includes
a positive electrode active material, a binder, and a conductive additive,
wherein the conductive additive contains carbon black, a carbon nanotube 1 having an average fiber diameter of 80 to 400 nm, and a carbon nanotube 2 having an average fiber diameter of 0.4 to 3.0 nm,
the content rates of the carbon black, the carbon nanotube 1, and the carbon nanotube 2 in the conductive additive are 40 to 80% by mass, 10 to 50% by mass, and 1 to 30% by mass, respectively, and
the content of the conductive additive in the positive electrode mixture layer is 0.1 to 5.0% by mass.

The conductive additive according to the present invention is a conductive additive used in an electrode mixture for a lithium-ion secondary battery, and includes:
carbon black, a carbon nanotube 1 having an average fiber diameter of 80 to 400 nm, and a carbon nanotube 2 having an average fiber diameter of 0.4 to 3.0 nm,
wherein the content rate of the carbon black is 40 to 80% by mass,
the content rate of the carbon nanotube 1 is 10 to 50% by mass, and
the content rate of the carbon nanotube 2 is 1 to 30% by mass.

Further, the positive electrode mixture according to the present invention includes a positive electrode active material, a binder, and a conductive additive,
wherein the conductive additive is the conductive additive according to the present invention, and
the content rate of the conductive additive is 0.1 to 5.0% by mass.

The conductive additive assists at least either electron conduction between active material particles or electron conduction in the active material particle, in the positive electrode mixture layer.

(Carbon Black)

The positive electrode mixture layer, for example, according to the present invention contains carbon black. The carbon black is not particularly limited, and carbon black having a BET specific surface area of 20 to 300 m²/g, preferably 30 to 150 m²/g, and more preferably 40 to 70 m²/g, with the amount of DBP oil absorbed being 100 to 400 mL/100 g, preferably 120 to 300 mL/100 g, and more preferably 130 to 250 mL/100 g, is suitably used.

The 50% particle diameter $D_{nc50}$ of a primary particle of the carbon black in a number-based cumulative particle size distribution is preferably 3 to 100 nm, more preferably 10 to 60 nm, and further preferably 20 to 50 nm. Details of a method of measuring $D_{nc50}$ will be described in the Examples section.

When the conductive additive is used in the positive electrode mixture layer, such carbon black can be present between particles of the positive electrode active material to form an electron conduction pathway and also to be able to hold an electrolytic solution. From the viewpoint of less impurities, the carbon black is more preferably acetylene black.

Later, the carbon black may be referred to as "CB."

(Carbon Nanotube 1)

The positive electrode mixture layer, for example, according to the present invention contains the carbon nanotube 1. The average fiber diameter of the carbon nanotube 1 is 80 nm or larger. The average fiber diameter of 80 nm or larger, can facilitate dispersion of the carbon nanotube 1 in a slurry for positive electrodes without application of large shear or compression force to the carbon nanotube 1. From this viewpoint, the average fiber diameter of the carbon nanotube 1 is preferably 100 nm or larger and more preferably 120 nm or larger.

Later, the carbon nanotube 1 may be referred to as a "CNT1."

The average fiber diameter of the carbon nanotube 1 is 400 nm or smaller. The carbon nanotube 1 having an average fiber diameter of 400 nm or smaller can impart sufficient electron conductivity with its small amount added, to an electrode mixture layer in particular a positive electrode mixture layer, when the conductive additive is used in the electrode mixture layer in particular the positive electrode mixture layer. From this viewpoint, the average fiber diameter of the carbon nanotube 1 is preferably 300 nm or smaller and more preferably 200 nm or smaller.

The average fiber length of the carbon nanotube 1 is preferably 2 μm or longer. With such a size, the carbon nanotube 1 can provide an electron conduction pathway over a long distance between active materials when the conductive additive is used in an electrode mixture layer, particularly in a positive electrode mixture layer. An electrolytic solution is supplied to the active material in contact with the carbon nanotube 1 through the carbon nanotube 1, thereby promoting supply of lithium ions to a surface of each active material to be able to lower resistance in a battery. From this viewpoint, the average fiber length of the carbon nanotube 1 is more preferably 3 μm or longer and further preferably 4 μm or longer.

The average fiber length of the carbon nanotube 1 is more preferably 20 μm or shorter. The carbon nanotube 1 having an average fiber length of 20 μm or shorter can enhance the electrode density when the conductive additive is used in an electrode mixture layer, particularly in a positive electrode mixture layer. In this regard, the average fiber length of the carbon nanotube 1 is more preferably 15 μm or shorter and further preferably 10 μm or shorter.

The average fiber diameter and average fiber length of the carbon nanotube 1 described above are obtained from a scanning electron microscope (SEM) image by measuring and averaging them with image recognition software, and details of the measurement method will be described in the Examples section.

(Carbon Nanotube 2)

The positive electrode mixture layer, for example, according to the present invention contains the carbon nanotube 2. The average fiber diameter of the carbon nanotube 2 is 0.4 nm or larger. The carbon nanotube 2 having an average fiber diameter of 0.4 nm or larger can maintain a fiber shape exhibiting toughness. From this viewpoint, the average fiber diameter of the carbon nanotube 2 is preferably 0.7 nm or larger and more preferably 1.0 nm or larger.

Later, the carbon nanotube 2 may be referred to as a "CNT2."

The average fiber diameter of the carbon nanotube 2 is 3.0 nm or smaller. The carbon nanotube 2 having an average fiber diameter of 3.0 nm or smaller is flexible, and when the conductive additive is used in an electrode mixture layer in particular a positive electrode mixture layer, it can cover a surface of the electrode active material, particularly the positive electrode active material. In this regard, the average fiber diameter of the carbon nanotube 2 is preferably 2.5 nm or smaller and more preferably 2.0 nm or smaller. The carbon nanotube 2 is further preferably a single-walled carbon nanotube (hereinafter may also be referred to as a "SWCNT").

The average fiber length of the carbon nanotubes 2 is preferably 5 μm or longer. This is because the average fiber length of 5 μm or longer allows the carbon nanotube 2 to entangle with an electrode active material particle, particularly the positive electrode active material particle, when the conductive additive is used in an electrode mixture layer, in particular a positive electrode mixture layer. From this viewpoint, the average fiber length of the carbon nanotube 2 is more preferably 10 μm or longer and further preferably 20 μm or longer. The average fiber length of the carbon nanotube 2 may be, for example, 30,000 μm or shorter.

The average fiber diameter and average fiber length of the carbon nanotube 2 described above are obtained from a scanning electron microscope (SEM) image by measuring and averaging them using image recognition software.

(Content Rate of Carbon Black)

The content rate of the carbon black in the conductive additive is 40 to 80% by mass. With the content rate of the carbon black of 40% by mass or more, an electrolytic solution can be sufficiently held when the conductive additive is used in an electrode mixture layer, particularly in a positive electrode mixture layer. From this perspective, the content rate of the carbon black is preferably 50% by mass or more and more preferably 60% by mass or more. With the content rate of carbon black of 80% by mass or less, the number of electron conduction pathways by other conductive additive can be increased, thereby enabling improvement of rate characteristics. From this viewpoint, the content rate of carbon black is preferably 75% by mass or less and more preferably 70% by mass or less.

(Content Rate of Carbon Nanotube 1)

The content rate of the carbon nanotube 1 in the conductive additive is 10 to 50% by mass. The content rate of 10% by mass or more allows an electrode mixture layer using the conductive additive, particularly a positive electrode mixture layer to render excellent ability to feed an electrolytic solution. From this viewpoint, the content rate of carbon nanotube 1 is preferably 20% by mass or more and more preferably 30% by mass or more. With the content rate of the carbon nanotube 1 of 50% by mass or less, an electron conduction pathway by other conductive additive can be increased when the conductive additive is used in an electrode mixture layer, particularly in a positive electrode mixture layer, whereby rate characteristics can be improved. From this perspective, the content rate is preferably 45% by mass or less and more preferably 40% by mass or less.

(Content Rate of Carbon Nanotube 2)

The content rate of the carbon nanotube 2 in the conductive additive is 1 to 30% by mass. The content rate of 1% by mass or more allows the number of electron conduction pathways on a surface of the positive electrode active material to be increased when the conductive additive is used in an electrode mixture layer, particularly in a positive electrode mixture layer. In this respective, the content rate of the carbon nanotube 1 is preferably 5% by mass or more and more preferably 10% by mass or more. With the content rate of the carbon nanotube 2 of 30% by mass or less, an electron conduction pathway by other conductive additive can be increased when the conductive additive is used in an electrode mixture layer, particularly in a positive electrode mixture layer, whereby the rate characteristics can be improved. From this perspective, the content rate is preferably 25% by mass or less and more preferably 20% by mass or less.

(Optional Carbon Nanotube)

The positive electrode mixture layer, for example, according to the present invention may contain a carbon nanotube other than the carbon nanotube 1 and the carbon nanotube 2 (hereinafter referred to as an "optional carbon nanotube") to the extent that effects of the present invention are not impaired.

The average fiber diameter of the optional carbon nanotubes is, for example, larger than 3.0 nm and smaller than 80 nm, preferably 5.0 nm to 70 nm, more preferably 5.0 nm to 60 nm, and the average fiber length is, for example, 1 to 300 µm, preferably 2 to 100 µm, and more preferably 3 to 50 µm. These values are obtained in the same manner as those for the carbon nanotube 1 and the carbon nanotube 2.

The content rate of the optional carbon nanotube in the conductive additive is, for example, 30% by mass or less.

(Positive Electrode Active Material)

The positive electrode mixture layer and the like according to the present invention contains a positive electrode active material. The positive electrode active material preferably contains at least one compound selected from the group consisting of $LiMPO_4$, wherein M is at least one element selected from the group consisting of Fe, Mn, Ni, and Co, $LiXO_2$, wherein X is at least one element selected from Ni, Mn, Co, and Al, $LiZ_2O_4$, wherein Z is at least one element selected from the group consisting of Ni and Mn. The positive electrode active material is more preferably carbon-coated $LiMPO_4$, wherein M is at least one element selected from the group consisting of Fe, Mn, Ni, and Co, and further preferably carbon-coated $LiFePO_4$.

The 50% particle diameter $D_{nA50}$ of the positive electrode active material in a number-based cumulative particle size distribution is preferably 0.1 to 20.0 µm. Details of a method of measuring $D_{nA50}$ will be described in the Examples section. With $D_{nA50}$ within such a range, a composite can be formed that matches sizes of the carbon black, the carbon nanotube 1, and the carbon nanotube 2, described below and is convenient for imparting electron conductivity to the positive electrode mixture layer. From these viewpoints, $D_{nA50}$ is more preferably 0.5 to 15.0 µm and more preferably 1.0 µm to 10.0 µm.

A 50% particle diameter $D_{V50}$ of the positive electrode active material in a volume-based cumulative particle size distribution is preferably 0.1 to 20.0 µm. Details of a method of measuring $D_{V50}$ will be described in the Examples section. With $D_{V50}$ within such a range, a composite can be formed that matches sizes of the carbon black, the carbon nanotube 1, and the carbon nanotube 2, described below and is convenient for imparting electron conductivity to the positive electrode mixture layer. From such viewpoints, $D_{V50}$ is more preferably 0.5 to 15.0 µm and further preferably 1.0 µm to 10.0 µm.

Particles of the positive electrode active material may be those granulated. In this case, the primary particle size is preferably 0.1 µm to 1.0 µm, more preferably 0.2 µm to 0.9 µm, and further preferably 0.3 µm to 0.8 µm.

The content rate of the positive electrode active material in the positive electrode mixture layer or the positive electrode mixture is preferably 80.0 to 99.0% by mass. The content rate of 80.0% by mass or more allows a positive electrode to have a sufficiently high capacity, thereby making it possible to obtain a battery with a high energy density. From this viewpoint, the content rate is more preferably 90.0% by mass or more and further preferably 95.0% by mass or more. The content rate of 99.0% by mass or less also allows sufficient electron conductivity to be imparted to the positive electrode mixture layer. From this viewpoint, the content rate is more preferably 98.0% by mass or less and further preferably 97.0% by mass or less.

(Binder)

The positive electrode mixture layer and the like according to the present invention contains a binder. The binder is not particularly limited, and a binder for positive electrodes, usually used in lithium-ion secondary batteries, can be used. Examples thereof include a polyvinylidene fluoride (PVdF) and a polytetrafluoroethylene (PTFE).

The content rate of binder in the positive electrode mixture layer or the positive electrode mixture is preferably 1.0 to 5.0% by mass. The content rate being 1.0% by mass or more enables forming without fallout of powder from the positive electrode mixture layer. From this viewpoint, the content rate of the binder is more preferably 2.0% by mass or more and further preferably 2.5% by mass or more. The content rate of binder being 5.0% by mass or less allows volume resistivity of the positive electrode mixture layer to be kept low. From this viewpoint, the content rate of binder is more preferably 4.0% by mass or less and further preferably 3.5% by mass or less.

(Content Rate of Conductive Additive)

The content rate of the conductive additive in the positive electrode mixture layer or the positive electrode mixture, i.e., the content rate of the total of the carbon black, the carbon nanotube 1, the carbon nanotube 2, and the optional carbon nanotube, described above, is 0.1 to 5.0% by mass. The content rate being 0.1% by mass or more enables sufficient electron conductivity to be imparted to the positive electrode mixture layer. From this viewpoint, the content rate is preferably 0.5% by mass or more and more preferably 1.0% by mass or more. The content rate of 5.0% by mass or less enables a mass ratio of the positive electrode active material to be increased, which therefore leads to a high energy density of a battery.

(Optional Component)

The positive electrode mixture layer and the like according to the present invention may contain a component other than the positive electrode active material, the binder, and the conductive additives (the carbon black, the carbon nanotube 1, and the carbon nanotube 2), which are the aforementioned essential components, to the extent that the effects of the present invention are not impaired. For example, in one embodiment, a dispersant is added upon fabrication of a slurry used to form the positive electrode mixture layer (i.e., a coating material for forming the positive electrode mixture layer), resulting in the dispersant that may remain in the positive electrode mixture. The positive electrode mixture may also contain an additive other than the dispersant.

<Positive Electrode>

The positive electrode according to the present invention is a positive electrode for a lithium-ion secondary battery having a current collector and a positive electrode mixture layer, wherein the positive electrode mixture layer is the positive electrode mixture layer for a lithium-ion secondary battery according to the present invention.

The positive electrode according to the present invention can be produced by forming the positive electrode mixture layer on the current collector. Examples of the method for forming the positive electrode mixture layer on the current collector include the following methods for producing the positive electrode mixture layer.

(Production Method of Positive Electrode Mixture Layer)

The method for producing a positive electrode mixture layer according to the present invention is not particularly limited, but preferably includes the following steps:

(1) A mixture obtained by mixing the positive electrode active material, the binder, the carbon black, the carbon nanotube 1 and the carbon nanotube 2, and solvent, described above, kneading them while adding more solvent to obtain a coating material for forming a positive electrode mixture layer for a lithium-ion secondary battery (hereinafter may be referred to as a "slurry for coating a positive electrode") containing a positive electrode mixture and the solvent.

(2) A current collector is coated with the slurry for coating a positive electrode.

(3) The solvent is removed from the coated slurry.

(4) The resulting formed product is pressed.

(Step (1): Preparation of Slurry for Coating Positive Electrode Mixture Layer)

First, by using a defoaming kneader or a kneader, a portion of solution and raw materials of the positive electrode mixture are mixed in a highly viscous condition. This enables uniform dispersion of the positive electrode active material, the carbon black, the carbon nanotube 1 and the carbon nanotube 2.

The carbon black, the carbon nanotube 1 and the carbon nanotube 2 may be mixed (i.e., the conductive additive may have been prepared) or may not be mixed prior to mixing with the positive electrode active material and the binder.

The solvent is appropriately selected depending on the binder, and for example, in a case in which the binder is polyvinylidene fluoride, N-methyl-2-pyrrolidone is suitably used as a solvent.

The resulting mixture is then kneaded with more solvent added to prepare a slurry having a viscosity facilitating coating, while maintaining a uniform mixing condition.

(Step (2): Coating)

The current collector is coated with the slurry for coating positive electrode by using a doctor blade or a coater, for example. The current collector is not particularly limited as long as it is a material that does not undergo oxidation and dissolution at high potential and is electron conductive, and an aluminum foil is usually used.

(Step (3): Solvent Removal)

The current collector coated with the slurry for coating a positive electrode, is heated, for example, by placing it on a hot plate or a heating apparatus attached to the coater, to remove the solvent. In other words, the current collector coated with the slurry for coating a positive electrode is dried. Thereafter vacuum drying is carried out to further remove the residual solvent.

(Step (4): Pressing)

As an electrode in a battery is used in a pressed condition, the product obtained in the above step is pressed with a roll press or by uniaxial pressing to form a positive electrode mixture layer on the current collector. An appropriate density of the positive electrode mixture layer differs depending on a true density of the positive electrode active material, and for example, in the case of $LiFePO_4$, the density is usually 2.0 g/cm$^3$ or higher. Pressing can increase this density.

Forming the positive electrode mixture layer on the current collector by such methods means, in other words, that a positive electrode composed of the current collector and the positive electrode mixture layer formed on the current collector, can be produced.

The positive electrode may also be produced by producing a positive electrode sheet, i.e., a sheet composed of the current collector and the positive electrode mixture layer formed on the current collector, adjusting an electrode density of the positive electrode by pressing followed by cutting the positive electrode sheet into a desired shape and size.

Lithium-Ion Secondary Battery

The lithium-ion secondary battery according to the present invention includes a positive electrode, a negative electrode, a separator, an electrolytic solution, and an outer packaging material of a cell, wherein the positive electrode is the positive electrode for a lithium-ion secondary battery according to the present invention.

<Positive Electrode>

The details of the positive electrode are as described above.

<Negative Electrode>

The negative electrode is composed of a negative electrode mixture layer and a current collector. The negative electrode mixture layer and a negative electrode mixture forming the negative electrode mixture layer, include a negative electrode active material, a binder, and a conductive additive as an optional component.

(Negative Electrode Active Material)

The negative electrode active material is not particularly limited, and a negative electrode active material used in ordinary lithium-ion secondary batteries can be suitably used. Examples of the negative electrode active material include graphite, hard carbon, a composite of silicon and carbon, and lithium titanate $Li_4Ti_5O_{12}$ (LTO). Two or more negative electrode active materials may be mixed together and used. A surface of the negative electrode active material may also be coated with amorphous carbon.

(Binder)

The binder contained in the negative electrode mixture is not particularly limited, and a binder used in ordinary lithium-ion secondary batteries can be suitably used. Examples of the binder include PVdF and PTFE as is the case with the binder contained in the positive electrode mixture, as well as styrene butadiene rubber (SBR), carboxymethyl cellulose (CMC), and a polyacrylic acid (PAA).

(Conductive Additive)

The conductive additive contained in the negative electrode mixture is not particularly limited, and the conductive additive according to the present invention described above or a conductive additive used in ordinary lithium-ion secondary batteries can be suitably used. Examples of the conductive additive include carbon black, fibrous carbon, or composites or mixtures thereof. Examples thereof also include other carbon materials such as graphene and graphite particles. In a case in which the carbon material such as graphite is used as the negative electrode active material, the conductive additive is not an essential component and may be added, as necessary. Two or more of the aforementioned conductive additives can be mixed together and used.

<Negative Electrode Mixture, Negative Electrode Mixture Layer, and Negative Electrode>

By mixing the aforementioned negative electrode active material, the binder, and the conductive additive as an optional component, the negative electrode mixture can be produced. A method for producing the negative electrode mixture layer and negative electrode (negative electrode sheet) is generally the same as that for producing the positive electrode mixture layer and positive electrode (positive electrode sheet), except that the negative electrode mixture is used instead of the positive electrode mixture. A current collector for the negative electrode differs from the case of the positive electrode in that a copper foil is usually used as the current collector for the negative electrode, and a density of the negative electrode mixture layer in the negative electrode is usually 1.4 g/cm$^3$ or higher.

<Electrolytic Solution>

The electrolytic solution is not particularly limited, and an electrolytic solution used in ordinary lithium-ion secondary batteries can be suitably used. In other words, an organic solvent in which an approximately 1M lithium salt is dissolved is usually used.

Examples of the lithium salt include $LiPF_6$, $LiBF_4$, $LiClO_4$, $LiAsF_6$, and LiFSI.

Examples of the organic solvent include ethylene carbonate (EC), ethyl methyl carbonate (EMC), dimethyl carbonate (DEC), diethyl carbonate (DEC), and propylene carbonate (PC). The organic solvents that are included here and other organic solvents may be appropriately selected, mixed together, and used.

The electrolytic solution may also contain an additive. Examples of the additive include vinylene carbonate (VC), propanesultone (PS), and fluoroethylene carbonate (FEC). The content rate of the additive in the electrolytic solution is preferably 0.01 to 20% by mass relative to 100% by mass of the electrolytic solution.

Ionic liquid composed only of cations and anions without solvent can also be an electrolytic solution of a lithium-ion secondary battery. Examples of the ionic liquid include, but are not limited to, cations such as imidazolium cations, pyrrolidinium cations, piperidinium cations, and ammonium cations, and anions such as bis(trifluoromethane)sulfonamide anions.

<Separator>

The separator can be freely selected from those that can be used in general lithium-ion secondary batteries, including combinations thereof, and examples thereof include a microporous film made of polyethylene or polypropylene, for example. A separator such that particles such as those of $SiO_2$ and $Al_2O_3$ as fillers are mixed to such a separator, and a separator, on a surface of which is attached by these particles, can also be used.

<Outer Packaging Material of Cell>

The outer packaging material of a cell, i.e., a battery case, is not particularly limited as long as it can house a positive electrode, a negative electrode, a separator, and an electrolytic solution. In addition to those standardized in the industry such as commercially available battery packs, 18650 cylindrical cell, and coin-shaped cells, the battery case, including those packed with an aluminum packaging material, for example, can be freely designed and used.

The electrodes may be stacked and packed for use. The single cells can be connected in series and used as batteries or modules.

EXAMPLES

Hereinafter, the present invention will be specifically described with reference to Examples and Comparative Examples, but the present invention is not limited to these Examples. The material properties were measured, and the battery characteristics were evaluated as follows.

[1] Evaluation of Material Properties

[1-1] 50% Particle Diameter $D_{V50}$ of Positive Electrode Active Material

One cupful of a very small spatula of a positive electrode active material and two drops of a 100 times dilute solution of an undiluted solution (32% by mass) of a nonionic surfactant (palm oil detergent High Power, manufactured by Saraya Co. Ltd.), were added to 15 mL of water, and the mixture was dispersed by ultrasonic waves for 3 minutes. This dispersion was charged into a laser diffraction-type particle size distribution analyzer (LMS-2000e) manufactured by Seishin Enterprise Co., Ltd., and a volume-based cumulative particle size distribution was measured to determine 50% particle diameter $D_{V50}$.

[1-2] Average Fiber Diameter and Average Fiber Length of Carbon Nanotube, 50% Particle Diameter $D_{nc50}$ of Primary Particle of Carbon Black and 50% Particle Diameter $D_{nA50}$ of Positive Electrode Active Material (Image Analysis by SEM)

A carbon tape was attached to a SEM sample stand, and a cut-out electrode was fixed on the tape for observation. The electrode underwent cross-sectional processing by using a cross-section polisher manufactured by JEOL Ltd. For CNT2 and CNT3 described below among the carbon nanotubes, the positive electrode mixture layer was separated from the positive electrode by using a solvent such as NMP, and solution including the separated positive electrode mixture layer was sonicated to disperse a positive electrode mixture. With a syringe, one drop of the resulting positive electrode mixture dispersion was dropped onto a SEM sample stand (made of Al and brass, for example) and dried at 120° C. under vacuum for 1 hour to fabricate a sample for SEM observation.

Specifically, the following methods were used for observation, measurement and analysis.

SEM: scanning electron microscope: Regulus® 8220 (manufactured by Hitachi High-Tech Science Corporation)

Acceleration voltage: 1 to 3 kV

Focal distance: 1.5 to 4.0 mm

Observation mode: SE+BSE (U)

Observation magnification: 5,000 to 100,000 times (magnification at which a target of interest can be clearly confirmed)

(Average Fiber Diameter of Carbon Nanotubes)

SEM observation was performed at magnification at which a width of a single carbon nanotube could fit in a field of view to measure a width (Pixcel) of any one point of the above carbon nanotube and to convert it to an actual length (unit: μm) by using a value of scale bar upon SEM measurement. ImageJ was used as image recognition software. The same operation was performed for a total of 100 arbitrarily selected carbon nanotubes, and a number-average value thereof was used as the average fiber diameter of the carbon nanotubes. However, a plurality of carbon nanotubes in a state of being entangled with each other or in bundle was excluded upon the measurement. Here, the "width" of the carbon nanotube is a dimension in a direction perpendicular to a longitudinal direction of the carbon nanotube.

(Average Fiber Length of Carbon Nanotubes)

SEM observation was performed at magnification at which a single carbon nanotube could fit in a field of view to measure a length of a straight line (Pixcel) connecting the two ends of the carbon nanotube in a longitudinal direction and to convert it to an actual length (unit: μm) by using a value of scale bar upon SEM measurement. Note, however, in measurements of CNT2 and CNT3 described below, when the carbon nanotube to be measured did not fit in one field of view, a plurality of SEM images was acquired along the carbon nanotube, and connected to each other to then measure the length of the carbon nanotube.

ImageJ was used as image recognition software. The same operation was performed for a total of 100 arbitrarily selected carbon nanotubes, and a number-average value thereof was used as the average fiber length of the carbon nanotubes. However, only fibers that could be recognized as being substantially straight among all fibers, were subjected to the measurement, and fibers that were rounded or largely curved were excluded from the measurement. In addition thereto, a plurality of carbon nanotubes in a state of being entangled with each other or in bundle was counted as one fiber and then measured.

(50% Particle Diameter $D_{nc50}$ of Primary Particle of Carbon Black)

SEM observation was performed at magnification that allowed primary particle sizes of a large number of carbon black to be confirmed, 100 primary particles were randomly selected from a SEM image, a circular equivalent diameter of each particle was measured, and the 50% particle diameter in a number-based cumulative particle size distribution was defined as $D_{nc50}$.

(50% Particle Diameter $D_{nA50}$ of Positive Electrode Active Material)

SEM observation was performed at magnification that allowed secondary particle sizes of a large number of positive electrode active materials to be confirmed, 100 positive electrode active material particles were randomly selected from a SEM image, the maximum size of each particle was measured, and the 50% particle diameter in a number-based cumulative particle size distribution was defined as $D_{nA50}$.

[2] Evaluation of Initial Coulomb Efficiency

[2-1] Confirmation of Capacity

In a thermostatic chamber at 25° C., the battery (two-electrode cell) fabricated in each of Examples or Comparative Examples described below, was charged at 8 mA in a CC-CV mode with the upper voltage limit of 4.2 V and a cutoff current value of 4.0 mA, and discharged at 8 mA in a CC mode with the lower voltage limit of 2.5 V. The above operations were repeated a total of four times, and a discharging capacity of the fourth time was used as a reference capacity (a) of the two-electrode cell. Capacities of all cells were confirmed to be within 80±4 mAh. In the present test, the "current value equivalent to 1 C" was also defined as 1×(a) mA.

[2-2] Initial Coulombic Efficiency

In the charge/discharge described in [2-1], a value obtained by dividing an initial discharging capacity by an initial charging capacity, expressed as a percentage, (initial discharging capacity)/(initial charging capacity)×100, was defined as the initial Coulomb efficiency (%).

[3] Measurement of Discharging DCR

A test was performed by using the battery (two-electrode cell) for which the reference capacity (a) was obtained in [2-1]. First, the battery was charged in a thermostatic chamber at 25° C. so that a charging capacity was 0.8 (a), i.e., a SOC was 80%. After the charge, the thermostatic chamber was set to −20° C. and allowed to stand for 24 hours, and then voltage (mV) after discharge at 0.5 C for 5 seconds was set to $V_{0.5}$. Similarly, voltage $V_{1.0}$ after discharge at 1 C for 5 seconds and $V_{2.0}$ after discharge at 2 C for 5 seconds, were determined, respectively. When a current value (mA) at 0.5 C is $I_{0.5}$, and similarly a current values at 1 C and 2 C are $I_{1.0}$ and $I_{2.0}$, respectively, DCR is obtained from a slope of a straight line obtained by using current and voltage by the least-squares method below.

$$\frac{\text{Covariance of current values and voltage values}}{\text{Variance of current values}} = \frac{\sum_{i=0.5}^{2.0}(I_i - I_{ave})(V_i - V_{ave})}{\sum_{i=0.5}^{2.0}(I_i - I_{ave})^2} (i = 0.5, 1.0, 2.0)$$

wherein $I_{ave}$ and $V_{ave}$ are average values of current and voltage, respectively.

[4] C-Rate Discharging Capacity Retention Rate

A test was performed by using the battery (two-electrode cell) for which the reference capacity (a) was obtained in [2-1]. For charge, charge in a CC mode was carried out at 0.2 C in a thermostatic chamber at 25° C. with the upper voltage limit of 4.2 V set from OCV, and then charge in a CV mode was carried out with a cutoff of 0.05 C.

Discharge was performed at 5.0 C in a CC mode with the lower limit voltage of 2.5 V while maintaining a temperature of the thermostatic chamber at 25° C., and a discharging capacity in this case was defined as a 5 C rate discharging capacity (c25) at 25° C. After the charge, the thermostatic chamber was set to a temperature of −20° C. and allowed to stand for 24 h, discharge was then performed at 0.5 C in a CC mode, and a discharging capacity in this case was defined as a 0.5 C rate discharging capacity (c−20) at −20° C.

Values obtained by dividing the C-rate discharging capacities (c−20) and (c25) measured under the above conditions by the reference capacity (a) of the two-electrode cell, respectively, expressed as percentages, i.e., 100×(c−20)/(a) and 100×(c25)/(a) were defined as the C-rate discharging capacity retention rate.

Examples 1 to 18 and Comparative Examples 1 to 14

(1. Negative Electrode Fabrication)

Chinese graphite powder with $D_{V50}$ of 6.1 μm was used as a negative electrode active material.

Styrene butadiene rubber (SBR) and carboxymethyl cellulose (CMC) were used as binders. Specifically, an SBR aqueous dispersion in which SBR having a solid content of 40% by mass had been dispersed and a 2 mass % CMC aqueous solution in which CMC powder had been dissolved were obtained.

As the conductive additive, carbon black (SUPER C 45 ®, manufactured by Imerys Graphite & Carbon), was used.

96.5 parts by mass of graphite powder, 0.5 parts by mass of the conductive additive, a CMC aqueous solution equivalent to 1.5 parts by mass of the CMC solid content, and an SBR water dispersion equivalent to 1.5 parts by mass of the SBR solid content, were mixed, thereto was added an appropriate amount of water for viscosity adjustment, and the mixture was kneaded by using a planetary centrifugal mixer (manufactured by THINCY CORPORATION) to obtain a slurry for forming a negative electrode mixture layer. The slurry concentration was 45 to 55% by mass.

A 20 μm thick copper foil that was a current collector foil, was uniformly coated with the above slurry for forming the negative electrode mixture layer by using a roll coater so that a thickness became uniform, dried on a hot plate, and then vacuum dried at 70° C. for 12 hours to form a negative electrode mixture layer on the current collector foil and to obtain a sheet composed of the negative electrode mixture layer and current collector foil.

The resulting sheet composed of the negative electrode mixture layer and current collector foil was adjusted so that a density of the negative electrode mixture layer was 1.5 to 1.6 g/cm$^3$, using a roll press, and it was punched out so that an area of the negative electrode mixture layer portion formed was 21.84 cm$^2$ (4.2 cm×5.2 cm), and an area of an unformed negative electrode mixture layer portion (i.e., a tab area) was 1.5 cm$^2$ (1.0 cm×1.5 cm), to then obtain a negative electrode.

Note, however, a coating thickness of the negative electrode mixture layer was adjusted so that a ratio Qa/Qc of a negative electrode discharging capacity Qa (mAh) to a positive electrode discharging capacity Qc (mAh) was 1.2.

(2. Positive Electrode Fabrication)

The conductive additive, positive electrode active material, and binder (polyvinylidene fluoride (PVdF)) with the proportions and types thereof listed in Table 1, were stirred and mixed while being appropriately added with N-methyl-2-pyrrolidone to fabricate a slurry dispersion.

The "C/LFP" in the column of the positive electrode active material in Table 1 refers to carbon-coated LiFePO$_4$ (commercial product ($D_{V50}$: 5.7 µm, $D_{nA50}$: 5.5 µm), a commercial product ($D_{V50}$: 18.9 µm, $D_{nA50}$: 18.6 µm), or a commercial product ($D_{V50}$: 0.7 µm, $D_{nA50}$: 0.6 µm)). The amount of carbon in the aforementioned carbon-coated film was 2.0% by mass of the amount of positive electrode active material. "NMC" refers to LiNi$_{0.8}$Mn$_{0.1}$Co$_{0.1}$O$_2$ (commercial product, $D_{V50}$: 7.4 µm, $D_{nA50}$: 7.2 µm), and "LMO" refers to LiMn$_2$O$_4$ (commercial product, $D_{V50}$: 7.8 µm, $D_{nA50}$: 7.5 µm).

Details of the conductive additive are as follows.

Acetylene black: DENKA BLACK® HS-100 (BET specific surface area: 39 m$^2$/g, DBP oil absorption amount: 140 mL/100 g, primary particle diameter $D_{nC50}$: 48 nm) manufactured by DENKA Corporation.

CNT1: Vapor-phase method carbon fiber VGCF®-H (manufactured by Showa Denko K.K.).

CNT2: Single-walled carbon nanotube (synthesized by a catalyst-supported thermal CVD method).

CNT3: Multi-walled carbon nanotube (synthesized by a catalyst-supported thermal CVD method).

A 20 µm thick aluminum foil was uniformly coated with the obtained dispersion by using a roll coater so that a thickness became uniform, and the coating film was dried, then underwent roll pressing, and punched out so that an area of the positive electrode mixture layer portion formed was 20.00 cm$^2$ (4.0 cm×5.0 cm) and an area of the unformed positive electrode mixture layer portion (i.e., a tab area) was 1.5 cm$^2$ (1.0 cm×1.5 cm), to then obtain a positive electrode. Note, however, a specific capacity (mAh/g) of the single electrode was confirmed followed by adjustment of a coating thickness of the positive electrode mixture layer so that a capacity of the positive electrode was 80 (mAh/20 cm$^2$). An electrode density was also adjusted to 2.1 g/cm$^3$ in the case of the positive electrode active material being C/LFP, 3.2 g/cm$^3$ for NMC, and 3.1 g/cm$^3$ for LMO, respectively.

(3. Fabrication of Two-Electrode Cell)

An Al tab was attached to the aluminum foil of the positive electrode and a Ni tab to the copper foil of the negative electrode. They were stacked opposed to each other via a film microporous membrane made of polypropylene and packed with an aluminum laminate, then poured with 1.2 mol/L LiPF$_6$/(EC/MEC/DMC=3/5/2 (by volume)+1 mass % VC) as an electrolytic solution, and an opening was sealed by thermal fusion to fabricate a battery (two-electrode cell).

Table 1 shows the content rate of the conductive additive in the positive electrode mixture layer, composition of the conductive additive, physical properties of the conductive additive, and physical properties of the positive electrode active material. Table 2 also shows the results of battery evaluation. In Table 1, the "MW" refers to a ""multi-walled" and the "SW" refers to a single-walled.

With regard to the evaluation results of batteries, when the 5 C rate discharging capacity retention rate of the two-electrode cell at 25° C. was 75% or more, and the 0.5 C rate discharging capacity retention rate at −20° C., was 35% or more, the battery was evaluated favorable.

According to Example 1 and Comparative Examples 1 to 3, when one of CB, CNT1, and CNT2 is not added, the rate characteristics are significantly reduced. This is considered due to different roles played by the conductive additives in each electrode. It is thought that CB contributes to exhibiting an electrolytic solution retention effect in the electrode, CNT1 extending over a plurality of positive electrode active material particles contributes to retaining a long-distance electron conduction pathway and a lithium ion diffusion pathway, and CNT2 connecting the conductive additives to each other contributes to forming a stronger network of the conductive additive. It is noted that in Examples, CNT2 was single-walled CNT, but the same effect as in Examples is expected to be exhibited even in the case of CNT2 being a multi-walled CNT. These effects become remarkable at high SOC, particularly where the positive electrode active material shrinks.

According to Comparative Examples 4 to 6, when one of CB, CNT1, and CNT2 is not added, the addition of multi-walled carbon nanotube (CNT3) does not improve the rate characteristics so much. This is surmised because, for example, in Comparative Example 5, CNT3 is shorter, thicker, and more rigid than CNT2, thereby having a weaker ability to form the conductive additive network.

In Comparative Example 4, it is surmised that even though CB is replaced with CNT3, it is lack in electron conductivity on a surface of the positive electrode active material and between adjacent active material particles and is poor in retention capability of an electrolytic solution, resulting in no characteristics being demonstrated.

In Comparative Example 6, it is surmised that even though CNT1 is replaced with CNT3, it cannot ensure an electron conduction pathway between active materials at a distance and lacks its rigidity and an effect of conducting an electrolytic solution, resulting in poor characteristics being exhibited.

From Examples 2 to 7 and Comparative Examples 7 to 11, it can be said that there is an optimum range for the proportion of the conductive additive added. This is considered because the roles played by the conductive additives are different as in the case described above, whereby too much or too little conductive additive will make it difficult to achieve a desired effect.

From Examples 8 and 9 and Comparative Examples 12 and 13, it can be said that there is an optimal average fiber diameter about CNT1. This is surmised because when CNT1 is too thin, it easily bends, thereby reducing ability to form a long-distance electron conduction pathway, and when CNT1 is too thick, the number of fibers per unit weight is reduced, making it difficult to obtain a resistance reduction effect by the addition.

From Comparative Example 14, it can be said that there is an optimal average fiber diameter about CNT2, too. This is thought because the thicker the CNT2 becomes, the less flexible it becomes, thereby reducing ability to form the conductive additive network.

TABLE 1

| | | Electrode composition | | | Conductive additive composition | | | |
|---|---|---|---|---|---|---|---|---|
| | | Conductive additive % by mass | Positive electrode active material % by mass | Binder % by mass | CB (acetylene black) % by mass | CNT1 (multi-walled CNT) % by mass | CNT2 (single-walled CNT) % by mass | CNT3 (multi-walled CNT) % by mass |
| Examples | 1 | 1.0 | 97.0 | 2.0 | 50 | 40 | 10 | — |
| | 2 | 1.0 | 97.0 | 2.0 | 40 | 50 | 10 | — |
| | 3 | 1.0 | 97.0 | 2.0 | 70 | 10 | 20 | — |
| | 4 | 1.0 | 97.0 | 2.0 | 40 | 30 | 30 | — |
| | 5 | 1.0 | 97.0 | 2.0 | 60 | 39 | 1 | — |
| | 6 | 1.0 | 97.0 | 2.0 | 80 | 15 | 5 | — |
| | 7 | 1.0 | 97.0 | 2.0 | 40 | 45 | 15 | — |
| | 8 | 1.0 | 97.0 | 2.0 | 50 | 40 | 10 | — |
| | 9 | 1.0 | 97.0 | 2.0 | 50 | 40 | 10 | — |
| | 10 | 1.0 | 97.0 | 2.0 | 50 | 40 | 10 | — |
| | 11 | 1.0 | 97.0 | 2.0 | 50 | 40 | 10 | — |
| | 12 | 1.0 | 97.0 | 2.0 | 50 | 40 | 10 | — |
| | 13 | 1.0 | 97.0 | 2.0 | 50 | 40 | 10 | — |
| | 14 | 1.0 | 97.0 | 2.0 | 50 | 40 | 10 | — |
| | 15 | 1.0 | 97.0 | 2.0 | 50 | 40 | 10 | — |
| | 16 | 4.9 | 93.1 | 2.0 | 50 | 40 | 10 | — |
| | 17 | 0.3 | 97.7 | 2.0 | 50 | 40 | 10 | — |
| | 18 | 1.0 | 97.0 | 2.0 | 40 | 40 | 10 | 10 |

| | | Conductive additive information | | | | | | Positive electrode active material information | |
|---|---|---|---|---|---|---|---|---|---|
| | | CNT1 | | CNT2 | | CNT3 | | Positive electrode active material | Particle diameter $D_{nA50}$ μm |
| | | Average fiber diameter nm | Average fiber length μm | Average fiber diameter nm | Average fiber length μm | Average fiber diameter nm | Average fiber length μm | | |
| Examples | 1 | 147 | 5.9 | 1.6 | 100 | — | — | C/LFP | 5.5 |
| | 2 | 147 | 5.9 | 1.6 | 100 | — | — | C/LFP | 5.5 |
| | 3 | 147 | 5.9 | 1.6 | 100 | — | — | C/LFP | 5.5 |
| | 4 | 147 | 5.9 | 1.6 | 100 | — | — | C/LFP | 5.5 |
| | 5 | 147 | 5.9 | 1.6 | 100 | — | — | C/LFP | 5.5 |
| | 6 | 147 | 5.9 | 1.6 | 100 | — | — | C/LFP | 5.5 |
| | 7 | 147 | 5.9 | 1.6 | 100 | — | — | C/LFP | 5.5 |
| | 8 | 388 | 6.1 | 1.6 | 100 | — | — | C/LFP | 5.5 |
| | 9 | 83 | 5.7 | 1.6 | 100 | — | — | C/LFP | 5.5 |
| | 10 | 150 | 9.7 | 1.6 | 100 | — | — | C/LFP | 5.5 |
| | 11 | 150 | 2.2 | 1.6 | 100 | — | — | C/LFP | 5.5 |
| | 12 | 147 | 5.9 | 1.6 | 100 | — | — | C/LFP | 18.6 |
| | 13 | 147 | 5.9 | 1.6 | 100 | — | — | C/LFP | 0.6 |
| | 14 | 147 | 5.9 | 1.6 | 100 | — | — | NMC | 7.2 |
| | 15 | 147 | 5.9 | 1.6 | 100 | — | — | LMO | 7.5 |
| | 16 | 147 | 5.9 | 1.6 | 100 | — | — | C/LFP | 5.5 |
| | 17 | 147 | 5.9 | 1.6 | 100 | — | — | C/LFP | 5.5 |
| | 18 | 147 | 5.9 | 1.6 | 100 | 8.1 | 17 | C/LFP | 5.5 |

| | | Electrode composition | | | Conductive additive composition | | | |
|---|---|---|---|---|---|---|---|---|
| | | Conductive additive % by mass | Positive electrode active material % by mass | Binder % by mass | CB (acetylene black) % by mass | CNT1 (multi-walled CNT) % by mass | CNT2 (single-walled CNT) % by mass | CNT3 (multi-walled CNT) % by mass |
| Comparative Examples | 1 | 1.0 | 97.0 | 2.0 | 80 | — | 20 | — |
| | 2 | 1.0 | 97.0 | 2.0 | 80 | 20 | — | — |
| | 3 | 1.0 | 97.0 | 2.0 | — | 70 | 30 | — |
| | 4 | 1.0 | 97.0 | 2.0 | 80 | — | 10 | 10 |
| | 5 | 1.0 | 97.0 | 2.0 | 80 | 10 | — | 10 |
| | 6 | 1.0 | 97.0 | 2.0 | — | 50 | 30 | 20 |
| | 7 | 1.0 | 97.0 | 2.0 | 90 | 5 | 5 | — |
| | 8 | 1.0 | 97.0 | 2.0 | 20 | 70 | 10 | — |
| | 9 | 1.0 | 97.0 | 2.0 | 50 | 5 | 45 | — |
| | 10 | 1.0 | 97.0 | 2.0 | 50 | 49.5 | 0.5 | — |
| | 11 | 1.0 | 97.0 | 2.0 | 30 | 30 | 40 | — |
| | 12 | 1.0 | 97.0 | 2.0 | 50 | 40 | 10 | — |

TABLE 1-continued

| | | | | | | | | |
|---|---|---|---|---|---|---|---|---|
| | 13 | 1.0 | 97.0 | 2.0 | 50 | 40 | 10 | — |
| | 14 | 1.0 | 97.0 | 2.0 | 50 | 40 | 10 | — |

| | | Conductive additive information | | | | | | Positive electrode active material information | |
|---|---|---|---|---|---|---|---|---|---|
| | | CNT1 | | CNT2 | | CNT3 | | Positive electrode active material | Particle diameter $D_{nA50}$ μm |
| | | Average fiber diameter nm | Average fiber length μm | Average fiber diameter nm | Average fiber length μm | Average fiber diameter nm | Average fiber length μm | | |
| Comparative Examples | 1 | — | — | 1.6 | 100 | — | — | C/LFP | 5.5 |
| | 2 | 147 | 5.9 | — | — | — | — | C/LFP | 5.5 |
| | 3 | 147 | 5.9 | 1.6 | 100 | — | — | C/LFP | 5.5 |
| | 4 | — | — | 1.6 | 100 | 8.1 | 17 | C/LFP | 5.5 |
| | 5 | 147 | 5.9 | — | — | 8.1 | 17 | C/LFP | 5.5 |
| | 6 | 147 | 5.9 | 1.6 | 100 | 8.1 | 17 | C/LFP | 5.5 |
| | 7 | 147 | 5.9 | 1.6 | 100 | — | — | C/LFP | 5.5 |
| | 8 | 147 | 5.9 | 1.6 | 100 | — | — | C/LFP | 5.5 |
| | 9 | 147 | 5.9 | 1.6 | 100 | — | — | C/LFP | 5.5 |
| | 10 | 147 | 5.9 | 1.6 | 100 | — | — | C/LFP | 5.5 |
| | 11 | 147 | 5.9 | 1.6 | 100 | — | — | C/LFP | 5.5 |
| | 12 | 512 | 8.9 | 1.6 | 100 | — | — | C/LFP | 5.5 |
| | 13 | 56 | 3.2 | 1.6 | 100 | — | — | C/LFP | 5.5 |
| | 14 | 147 | 5.9 | 4.6 | 100 | — | — | C/LFP | 5.5 |

TABLE 2

| | | Initial Coulombic efficiency % | Discharging DCR (SOC80%) −20° C. Ω | Rate characteristics | |
|---|---|---|---|---|---|
| | | | | 25° C. 5 C discharging capacity retention rate % | −20° C. 0.5 C discharging capacity retention rate % |
| Examples | 1 | 92.8 | 755 | 81.2 | 43.1 |
| | 2 | 92.8 | 812 | 79.8 | 38.8 |
| | 3 | 92.7 | 802 | 80.0 | 39.6 |
| | 4 | 92.8 | 799 | 80.1 | 39.8 |
| | 5 | 92.7 | 825 | 79.5 | 37.8 |
| | 6 | 92.7 | 793 | 80.3 | 40.2 |
| | 7 | 92.8 | 843 | 79.0 | 36.5 |
| | 8 | 92.8 | 796 | 80.2 | 40.0 |
| | 9 | 92.8 | 819 | 79.6 | 38.3 |
| | 10 | 92.8 | 788 | 80.4 | 40.6 |
| | 11 | 92.8 | 850 | 78.8 | 35.9 |
| | 12 | 92.8 | 835 | 79.2 | 37.1 |
| | 13 | 92.8 | 853 | 78.8 | 35.7 |
| | 14 | 92.8 | 675 | 83.2 | 49.1 |
| | 15 | 92.8 | 645 | 83.9 | 51.4 |
| | 16 | 91.8 | 659 | 83.6 | 50.3 |
| | 17 | 92.9 | 854 | 78.7 | 35.6 |
| | 18 | 92.7 | 712 | 82.3 | 46.3 |
| Comparative Examples | 1 | 92.7 | 952 | 76.3 | 28.3 |
| | 2 | 92.7 | 1043 | 74.0 | 21.4 |
| | 3 | 92.9 | 1129 | 71.9 | 14.9 |
| | 4 | 92.7 | 921 | 77.1 | 30.6 |
| | 5 | 92.7 | 1013 | 74.8 | 23.7 |
| | 6 | 92.8 | 1094 | 72.8 | 17.6 |
| | 7 | 92.7 | 967 | 75.9 | 27.1 |
| | 8 | 92.8 | 943 | 76.5 | 28.9 |
| | 9 | 92.8 | 933 | 76.8 | 29.7 |
| | 10 | 92.8 | 977 | 75.7 | 26.4 |
| | 11 | 92.8 | 936 | 76.7 | 29.5 |
| | 12 | 92.8 | 899 | 77.6 | 32.2 |
| | 13 | 92.8 | 915 | 77.2 | 31.0 |
| | 14 | 92.8 | 920 | 77.1 | 30.7 |

INDUSTRIAL APPLICABILITY

The lithium-ion secondary batteries produced by using the conductive additive, positive electrode mixture, and positive electrode mixture layer, for example, according to the present invention can be used as power sources for electronic devices such as smartphones, tablet PCs, and portable information terminals; power sources for electric motors such as power tools, vacuum cleaners, electric bicycles, drones, and electric vehicles; storage of electric power obtained by fuel cells, solar power generation, and wind power generation, for example.

What is claimed is:

1. A positive electrode mixture layer for a lithium-ion secondary battery, the layer comprising:
   a positive electrode active material, a binder, and a conductive additive,
   wherein the conductive additive comprises carbon black, a carbon nanotube 1 having an average fiber diameter of 80 to 400 nm, and a carbon nanotube 2 having an average fiber diameter of 0.4 to 3.0 nm and an average fiber length of 10 μm or longer,
   the content rates of the carbon black, the carbon nanotube 1, and the carbon nanotube 2 in the conductive additive are 40 to 80% by mass, 10 to 50% by mass, and 1 to 30% by mass, respectively, and
   the content rate of the conductive additive in the positive electrode mixture layer is 0.1 to 5.0% by mass.

2. The positive electrode mixture layer for a lithium-ion secondary battery according to claim 1, wherein the carbon nanotube 2 is a single-walled carbon nanotube.

3. The positive electrode mixture layer for a lithium-ion secondary battery according to claim 1, wherein the average fiber length of the carbon nanotube 1 is 2 to 20 μm.

4. The positive electrode mixture layer for a lithium-ion secondary battery according to claim 1, wherein the average fiber length of the carbon nanotube 2 is 20 μm or longer.

5. The positive electrode mixture layer for a lithium-ion secondary battery according to claim 1, wherein the carbon black is acetylene black.

6. The positive electrode mixture layer for a lithium-ion secondary battery according to claim 1, wherein the 50% particle diameter $D_{nc50}$ of a primary particle of the carbon black in a number-based cumulative particle size distribution is 3 to 100 nm.

7. The positive electrode mixture layer for a lithium-ion secondary battery according to claim 1, wherein the positive electrode active material comprises at least one compound selected from the group consisting of $LiMPO_4$, wherein M is at least one element selected from the group consisting of Fe, Mn, Ni and Co, $LiXO_2$, wherein X is at least one element selected from Ni, Mn, Co, and Al, and $LiZ_2O_4$, wherein Z is at least one element selected from the group consisting of Ni and Mn.

8. The positive electrode mixture layer for a lithium-ion secondary battery according to claim 7, wherein the positive electrode active material is carbon-coated $LiFePO_4$.

9. The positive electrode mixture layer for a lithium-ion secondary battery according to claim 1, wherein the 50% particle diameter $D_{nA50}$ of the positive electrode active material in a number-based cumulative particle size distribution is 0.1 to 20.0 μm.

10. A positive electrode for a lithium-ion secondary battery, the electrode comprising a current collector and a positive electrode mixture layer, wherein the positive electrode mixture layer is the positive electrode mixture layer for a lithium-ion secondary battery according to claim 1.

11. A lithium-ion secondary battery, comprising a positive electrode, a negative electrode, a separator, an electrolytic solution, and an outer packaging material of a cell, wherein the positive electrode is the positive electrode for a lithium-ion secondary battery according to claim 10.

12. A conductive additive used in an electrode mixture for a lithium-ion secondary battery, the additive comprising:
    carbon black, a carbon nanotube 1 having an average fiber diameter of 80 to 400 nm, and a carbon nanotube 2 having an average fiber diameter of 0.4 to 3.0 nm and an average fiber length of 10 μm or longer,
    wherein the content rate of the carbon black is 40 to 80% by mass,
    the content rate of the carbon nanotube 1 is 10 to 50% by mass, and
    the content rate of the carbon nanotube 2 is 1 to 30% by mass.

13. The conductive additive used in an electrode mixture for a lithium-ion secondary battery according to claim 12, wherein the average fiber length of the carbon nanotube 2 is 20 μm or longer.

14. A positive electrode mixture for a lithium-ion secondary battery, the mixture comprising:
    a positive electrode active material, a binder, and an conductive additive,
    wherein the conductive additive is the conductive additive according to claim 12, and
    a content rate of the conductive additive is 0.1 to 5.0% by mass.

15. A coating material for forming a positive electrode mixture layer for a lithium-ion secondary battery, the material comprising the positive electrode mixture according to claim 14 and a solvent.

* * * * *